United States Patent
Maurya et al.

(10) Patent No.: US 11,250,344 B2
(45) Date of Patent: Feb. 15, 2022

(54) MACHINE LEARNING BASED ANALYTICS PLATFORM

(71) Applicant: HCL Technologies Limited, Uttar Pradesh (IN)

(72) Inventors: Arvind Kumar Maurya, Noida (IN); Yogesh Gupta, Noida (IN); Parveen Jain, Noida (IN); S U M Prasad Dhanyamraju, Hyderabad (IN)

(73) Assignee: HCL Technologies Limited, Noida (IN)

(*) Notice: Subject to any disclaimer, the term of this patent is extended or adjusted under 35 U.S.C. 154(b) by 1022 days.

(21) Appl. No.: 15/627,258

(22) Filed: Jun. 19, 2017

(65) Prior Publication Data

US 2018/0012145 A1   Jan. 11, 2018

(30) Foreign Application Priority Data

Jul. 7, 2016   (IN) .............................. 201611023324

(51) Int. Cl.
*G06N 20/00* (2019.01)
*G06N 5/04* (2006.01)
(Continued)

(52) U.S. Cl.
CPC .............. *G06N 20/00* (2019.01); *G06F 3/048* (2013.01); *G06N 5/022* (2013.01); *G06N 5/04* (2013.01); *G06Q 10/067* (2013.01)

(58) Field of Classification Search
CPC .......... G06N 20/00; G06N 5/022; G06N 5/04; G06Q 30/0201; G06Q 10/0633; G06Q 10/067; G06F 3/048
See application file for complete search history.

(56) References Cited

U.S. PATENT DOCUMENTS 8,332,337 B2   12/2012   Harrison et al.
9,710,767 B1 *   7/2017   Dietrich ............... G06Q 10/063
(Continued)

FOREIGN PATENT DOCUMENTS

DE   102011075231 A1   11/2012

OTHER PUBLICATIONS

Berthold et al., KNIME—The Konstanz Information Miner, SIGKDD Explorations vol. 11, issue 1, pp. 26-31, Jul. 2009. (Year: 2009).*
(Continued)

*Primary Examiner* — Kamran Afshar
*Assistant Examiner* — Marshall L Werner
(74) *Attorney, Agent, or Firm* — Kendal Sheets

(57) ABSTRACT

The present subject matter discloses a system and method to enable a machine learning based analytics platform. The method may comprise generating a graphical user interface to enable one or more stakeholders to generate and manage a model for predictive analysis. The method may further comprise enabling a business user to define the business problem, and generate models to perform predictive analysis. The method may further comprise deploying the model, in a distributed environment, over a target platform. The method may further comprise monitoring the model to identify at least one error in the model and re-training the
(Continued)

model for performing predictive analysis based on the at least one error, thereby enabling the machine learning based analytics platform.

16 Claims, 7 Drawing Sheets

(51) Int. Cl.
| | | |
|---|---|---|
| *G06Q 10/06* | (2012.01) | |
| *G06F 3/048* | (2013.01) | |
| *G06N 5/02* | (2006.01) | |

(56) References Cited

U.S. PATENT DOCUMENTS

| | | | | |
|---|---|---|---|---|
| 2007/0112574 | A1* | 5/2007 | Greene | H04W 12/122 |
| | | | | 340/572.1 |
| 2009/0089078 | A1* | 4/2009 | Bursey | H04W 4/70 |
| | | | | 705/300 |
| 2010/0114806 | A1 | 5/2010 | Harrison et al. | |
| 2012/0290412 | A1* | 11/2012 | Marovets | G06Q 30/02 |
| | | | | 705/14.73 |
| 2013/0066717 | A1* | 3/2013 | Marovets | G06Q 30/02 |
| | | | | 705/14.49 |
| 2013/0095864 | A1* | 4/2013 | Marovets | H04L 51/08 |
| | | | | 455/466 |
| 2013/0191185 | A1* | 7/2013 | Galvin | G06Q 10/10 |
| | | | | 705/7.37 |
| 2014/0172490 | A1* | 6/2014 | Snyder | G06Q 10/06313 |
| | | | | 705/7.23 |
| 2017/0185904 | A1* | 6/2017 | Padmanabhan | G06N 5/04 |

OTHER PUBLICATIONS

KNIME 2.12 The Facts. The Featuers. Nuew Functionality., https://www.knime.com/blog/knime-212-the-facts-the-features-new-functionality, Aug. 2015. (Year: 2015).*

Bakos, Gabor, KNIME Essentials, Packt Publishing, 2013. (Year: 2013).*

Winters et al., Taming the Internet of Things with KNIME, KNIME whitepaper, 2014. (Year: 2014).*

Winters et al., Social Media, Recommendation Engines and Real-Time Model Execution: A Practical Case Study, Knime whitepaper, 2011. (Year: 2011).*

Sindhwani et al., Structured Transforms for Small-Footprint Deep Learning, pp. 1-9, Oct. 2015. (Year: 2015).*

Musthaler et al., Data Masking Secures Sensitive Data in Non-Production Environments, Network World, Oct. 23, 2009. (Year: 2009).*

Silipo et al., Data and Machine Architecture for the Data Science Lab, KNIME whitepaper, 2015. (Year: 2015).*

* cited by examiner

MACHINE LEARNING BASED ANALYTICS PLATFORM

CROSS-REFERENCE TO RELATED APPLICATIONS AND PRIORITY

The present application claims priority from Indian Patent Application No. 201611023324 filed on 7 Jul. 2016 the entirety of which is hereby incorporated by reference.

TECHNICAL FIELD

The present subject matter described herein, in general, relates to an analytics platform and, in particular, related to a machine learning based analytics platform with participatory workflows, distributed execution and integrated deployment built using Semantic Data Models for Products, Services and Devices.

BACKGROUND

Nowadays there is lots of thrust by organizations to use huge amounts of data available through logs, social media, internet, support systems etc. to become data driven organizations. However, to capitalize on data received from these locations is not that straightforward. A systematic analytical platform needs to be established in order to define, develop, deploy and manage models with respect to the problem to be solved. Traditional systems and tools available today face many challenges in order to address the large amount of data captured from different sources.

The existing data analytics platforms are incapable of bridging the gap of problem definition and provisioning data against the problem and making sure that rest of the stakeholders are in sync to it. The process of using huge data to derive insights is tedious, costly and time consuming. Further, the process of consuming data from different sources and changing data requirements is an added overhead in the project which can affect timelines. Further, with the fast changing web standards, security threats there is no predictability in how end users will protect data as well application. The existing systems lack in data governance to effectively manage the data and models derived against them.

Some of the systems are based on extensive manual coding to solve each business problem related to prescriptive and predictive analytics which is a time cumbersome process. Ability to manage product variants and associated data models seamlessly during and post implementation, reliance on existing infrastructure investments, and shortage of adequate skillets are some other issues in the existing data analytics platforms. Thus the existing systems are incapable of providing an intelligent, automated and service based solution which is user friendly, fast, cost effective, and can use power of distributed processing and can cope up with the new or emerging devices, data and services.

SUMMARY

This summary is provided to introduce aspects related to systems and methods for enabling machine learning based analytics platform are further described below in the detailed description. This summary is not intended to identify essential features of subject matter nor is it intended for use in determining or limiting the scope of the subject matter.

In one implementation, a system for enabling machine learning based analytics platform is disclosed. The system comprises a processor and a memory coupled to the processor. The processor may execute a plurality of modules stored in the memory. The plurality of modules may comprise a graphical user interface module and a central data analysis module. The graphical user interface module may enable one or more stake holders to generate and manage a model. In one embodiment, the stakeholders may include a business user, a data scientist, a system engineer, and a system manager. Further the model may be configured to solve a business problem defined by the business user. Further, the central data analysis module may enable a business user module for enabling the business user to define the business problem and a data preparation module for enabling the service manager to configure a data source location based on the business problem, extracting source data from the data source location, and translating the source data based on ontology mapping, define by the system engineer, to generate a translated data. In one embodiment, the translated data may be stored in a distributed storage. Further, the central data analysis module may enable a model creation module for enabling the data scientist and system manager to explore and visualize the translated data, transform and standardize the translated data to generate the model, evaluate and calibrate accuracy of the model, and save the model over metadata storage. Further, the central data analysis module may enable a model deployment module configured to deploy the model, in distributed environment, over a target platform. Further, the central data analysis module may enable a model monitoring module configured to monitor the model and identify at least one error in the model. Further, the central data analysis module may enable a model training module configured to re-train the model, for performing predictive analysis, based on the at least one error, thereby enable machine learning based analytics platform.

In another implementation, a method for machine learning based analytics platform is disclosed. The method may comprise generating, by a processor, a graphical user interface to enable one or more stake holders to generate and manage a model. The stakeholders may include a business user, a data scientist, a system engineer, and a system manager. In one embodiment, the model may be configured to solve a business problem defined by the business user. The method may further comprise enabling, by the processor, the business user to define the business problem, and the service manager to configure a data source location based on the business problem. The method may further comprise extracting, by the processor, source data from the data source location, and translating the source data based on ontology mapping, define by the system engineer, to generate a translated data, wherein the translated data is stored in a distributed storage. The method may further comprise enabling, by the processor, the data scientist and system manager to explore and visualize the translated data, transform and standardize the translated data to generate the model, evaluate and calibrate accuracy of the model, and save the model over metadata storage. The method may further comprise deploying, by the processor, the model, in distributed environment, over a target platform. The method may further comprise monitoring, by the processor, the model to identify at least one error in the model and re-training the model for performing predictive analysis based on the at least one error, thereby enable machine learning based analytics platform.

Yet in another implementation, a non-transitory computer readable medium embodying a program executable in a computing device for enabling machine learning based analytics platform is disclosed. The program may comprise a program code for generating a graphical user interface to enable one or more stake holders to generate and manage a model. The stakeholders may include a business user, a data scientist, a system engineer, and a system manager. In one embodiment, the model may be configured to solve a business problem defined by the business user. The program may further comprise a program code for enabling the business user to define the business problem, and the service manager to configure a data source location based on the business problem. The program may further comprise a program code for extracting source data from the data source location, and translating the source data based on ontology mapping, define by the system Engineer, to generate a translated data. In one embodiment, the translated data may be stored in a distributed storage. The program may further comprise a program code for enabling the data scientist and system manager to explore and visualize the translated data, transform and standardize the translated data to generate the model, evaluate and calibrate accuracy of the model, and save the model over metadata storage. The program may further comprise a program code for deploying the model, in distributed environment, over a target platform. The program may further comprise a program code for monitoring the model to identify at least one error in the model and re-training the model for performing predictive analysis based on the at least one error, thereby enable machine learning based analytics platform.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

In one embodiment, a system to enable machine learning based analytics platform is disclosed. The system enables participatory workflows, distributed execution and integrated deployment using Semantic Data Models for products, services and devices. System may be classified in to four blocks namely platform core block, Platform Analytical Service. Platform Data translation/Acquisition service, and Application Portal. The platform core block provides overarching services to define, develop, deploy and manage models created to solve business problems. Further, the platform analytical block provides services for data mining and model creation. Platform Data translation/Acquisition block provides data translation services to acquire data from various data source's based on the ontology mapping. Further, the application portal enables web based interface to interact with all platform services to define problem statement, enable data provisioning with HBI data handling, define ontology with data mapping, models development & verification and manage workflow execution. The application portal also includes dashboards and reporting which empowers users with workflow and execution traceability.

While aspects of described system and method for enabling machine learning based analytics platform may be implemented in any number of different computing systems, environments, and/or configurations, the embodiments are described in the context of the following exemplary system.

Figure 1:
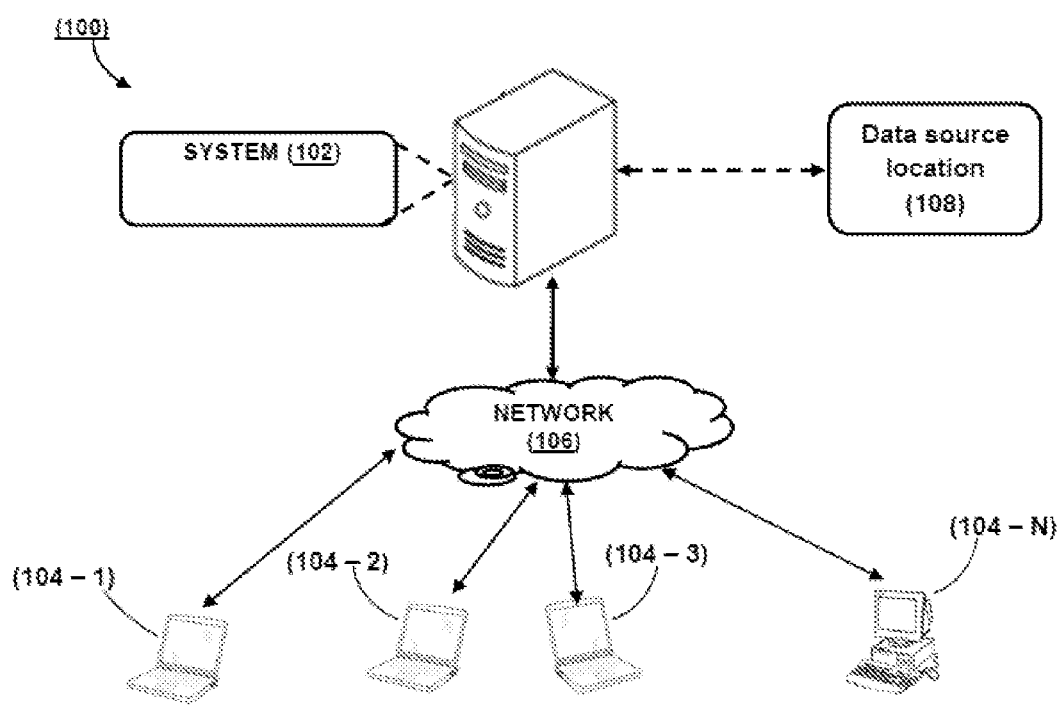
FIG. 1 illustrates a network implementation of a system for enabling machine learning based analytics platform, in accordance with an embodiment of the present subject matter.

Referring to FIG. 1, a network implementation 100 of system 102 for enabling machine learning based analytics platform is illustrated, in accordance with an embodiment of the present subject matter. Although the present subject matter is explained considering that the system 102 is implemented for enabling machine learning based analytics platform on a server, it may be understood that the system 102 may also be implemented in a variety of computing systems, such as a laptop computer, a desktop computer, a notebook, a workstation, a mainframe computer, a server, a network server, a tablet, a mobile phone, and the like. In one embodiment, the system 102 may be implemented in a cloud-based environment. It will be understood that the system 102 may be accessed by multiple users through one or more user devices 104-1, 104-2, 104-3 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106. Further, the system 102 may be also connected with data source location 108.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
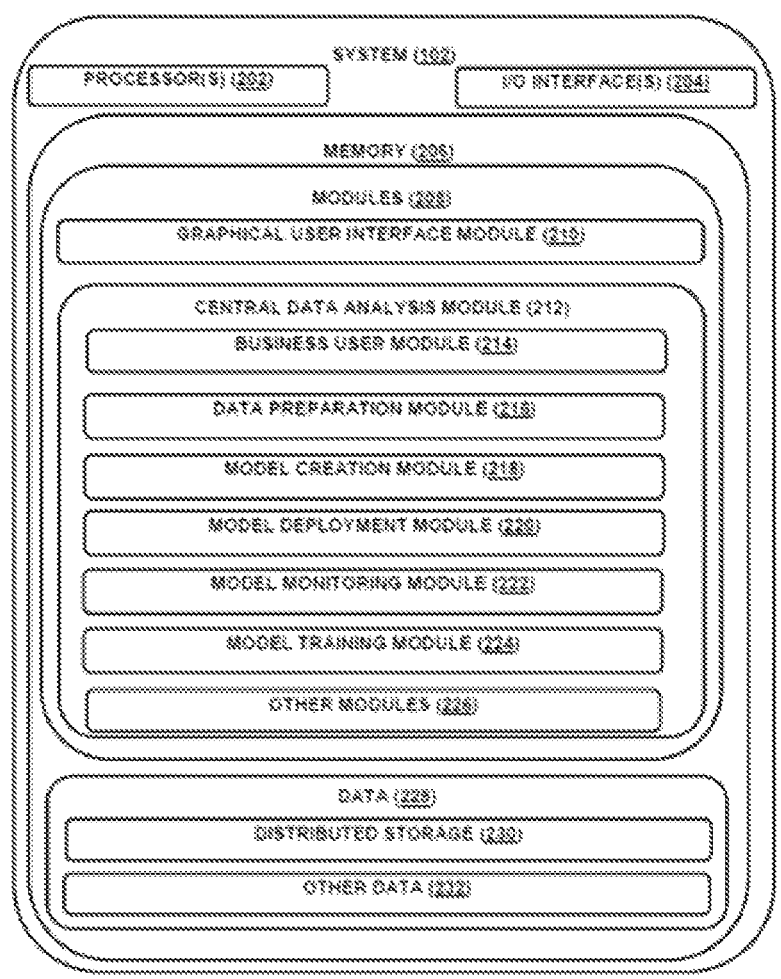
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 228.

The modules 208 include routines, programs, objects, components, data structures, etc., which perform particular tasks or implement particular abstract data types. In one implementation, the modules 208 may include a graphical user interface module 210, a central data analysis module 212. The central data analysis module 212 may further enable a business user module 214, a data preparation module 216, a model creation module 218, a model deployment module 220, a model monitoring module 222, a model training module 224, and other modules 226. The other modules 226 may include programs or coded instructions that supplement applications and functions of the system 102.

The data 228, amongst other things, serves as a repository for storing data processed, received, and generated by one or more of the modules 208. The data 228 may also include rule database 230, and other data 232.

In one embodiment, the graphical user interface module 210 may enable one or more stake holders to generate and manage a model. In one embodiment, the stakeholders may include a business user, a data scientist, a system engineer, and a system manager. Further the model may be configured to solve a business problem defined by the business user. In one embodiment, the graphical user interface module 210 may enable the stakeholders to design workflow of the model. The model may be a cross-platform PMML (Predictive Model Markup Language) model, and wherein model may be executed in a real-time mode and in an offline mode.

Further, the graphical user interface module 210 may enable user interface elements include an activity bar, a property panel, a header, a main menu bar, a designer space, and a design Menu. Further, each user interface element may enable the pick and place code blocks to design workflow of the model. The user interface module 210 is further elaborated with respect to FIG. 3A.

Further, the central data analysis module 212 may enable a business user module 214 for enabling the business user to define the business problem. The problem definition is visible to other stakeholders of the system 102. Once the business problem is logged into the system 102, the stakeholders can contribute themselves to develop the model for performing predictive analysis.

Further, the data preparation module 216 is configured to enable the service manager to configure a data source location 108 based on the business problem. For instance, the service manager may define data source location such as log files, social media, internet, support systems, a RDBMS, a NoSQL database, Big Data, File systems, and sensor data captured from IOT network. Further, the data preparation module 216 is configured to extract source data from the data source location 108 and translating the source data based on ontology mapping, define by the system engineer, to generate a transformed data.

In one embodiment, the transformed data may be stored in a distributed storage 230. Further, the central data analysis module 212 may enable a model creation module 218 for enabling the data scientist and system manager to explore and visualize the translated data. The data scientist and system manager may user different known techniques to explore and visualize the translated data. Based on the visualization, the translated data is transform and standardize to generate the model. Further, the model creation module 218 may be used to evaluate and calibrate accuracy of the model and save the model over the distributed storage 230.

Further, the central data analysis module 212 may enable a model deployment module 220 configured to deploy the model, in distributed environment, over a target platform. The target platform may be specified by the business user in the problem definition. In one embodiment, the target platform may be selected from a public cloud server, an in-premise cloud server, an installed gateway or an edge device in field.

Further, the central data analysis module 212 may enable a model monitoring module 222 configured to monitor the model and identify at least one error in the model. The error may be in the form of accuracy of prediction. If the accuracy of prediction drops below a certain threshold level, the model monitoring module 222 may generate alerts to the stakeholders of the system 102 to retrain the model.

Further, the central data analysis module 212 may enable a model training module 224 configured to re-train the model, for performing predictive analysis, based on the at least one error, thereby enable machine learning based analytics platform.

Referring now to FIGS. 3A, 3B, 3C and 3D illustrating detail explanation of the system 102, in accordance with an embodiment of the present subject matter.

Figure 3A:
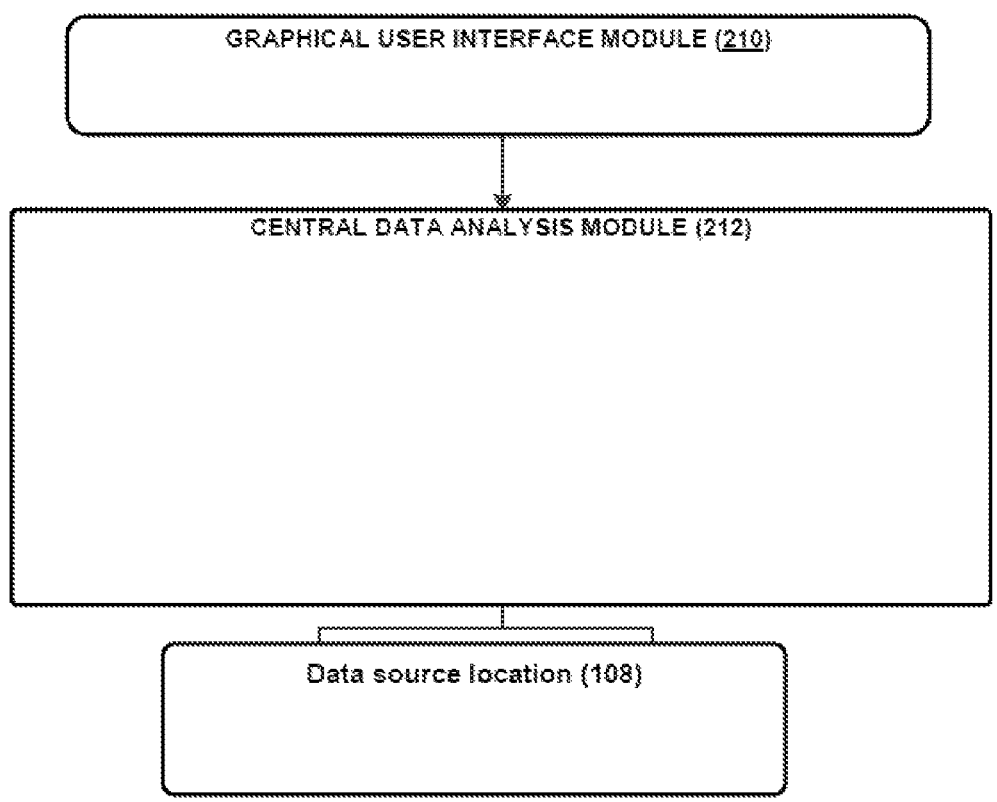
FIGS. 3A, 3B, 3C and 3D illustrates detail explanation of the system, in accordance with an embodiment of the present subject matter.

Referring now to FIG. 3A, the overview of the system 102 is disclosed. The system 102 is divided into three layers namely the user interface module 210, the central data analysis module 212, and the data source location 108. The user interface module 210 is configured for end users/stakeholders to interact with the system 102. Further, the central data analysis module 212 acts as a main platform providing all the services for model generation and maintenance. The central data analysis module 212 enables the model creation module 218 for providing features to create and deploy models in distributing processing environment. Further, the model monitoring module 222 enabled by the central data analysis module 212 is configured to provide core services for core functionalities like Report and data visualization, Model and data versioning and work flow etc., using a meta data storage. The central data analysis module 212 also enables the data preparation module 216 to extract source data from data source location 108 and perform data acquisitions and translation as per device ontology using distributed data storage 230. The source data may be originally generated by Device/Sensors or captured from other sources managed by the device owners like a Relational Database Management System (RDBMS), a not only Structured Query Language (NoSQL) database, big data, file systems etc.

Figure 3B:
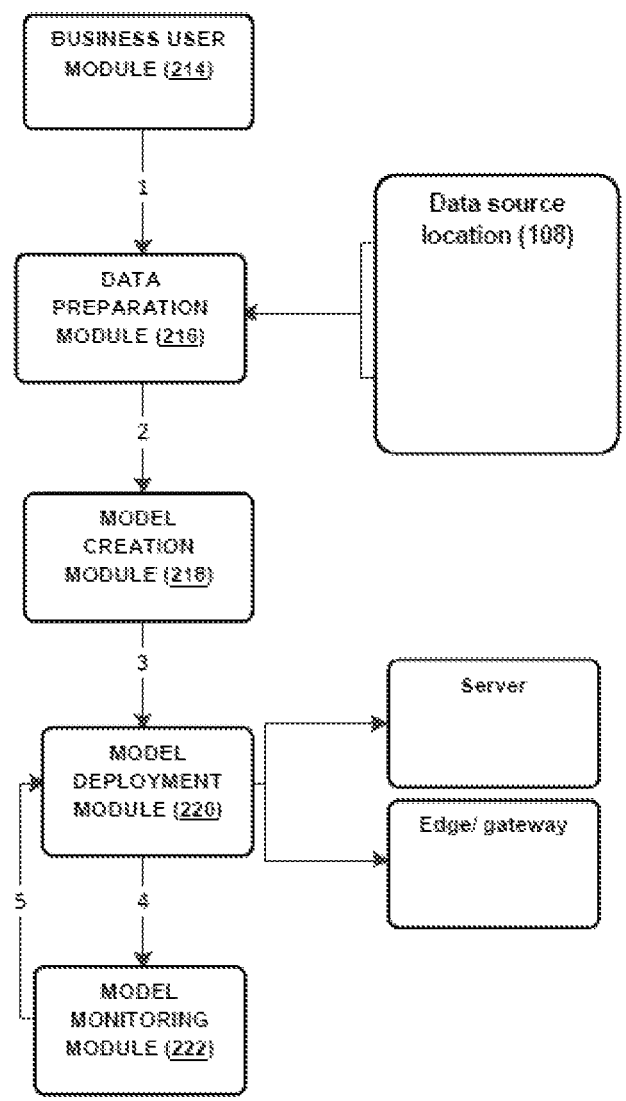

Referring now to FIG. 3B, process flow diagram of the system 102 is illustrated. In one embodiment, the business user may logon to the system 102 through the business user module 214. In one embodiment, the user interface module 210 enables privileged access to each stakeholder of the system 102. The business user may log business problem into the system 102 using the business user module 214. This business problem is further assigned to the Service manager and the System Engineer to Map Device sensor observer property to Data generated by the device and Integrate desperate data source based on ontology using Data preparation module 216. Further, the source data may comprise a High Business Impact (HBI) data. The data preparation module 216 is configured to mask the HBI data before extracting the source data from the data source location. Once the source data is extracted, in the next step, the business problem is moved to the data scientist to explore historical data and create cross-platform PMML model using Model Creation module 218. Once Model is created, the model is scheduled for deployment on target platform. Target platform could be a public or an in-premise cloud server or an installed device (Gateway/Edge) in a field. Further, the model is executed by the model deployment module 220 on scheduled time to analyze the running data in batch or real time and store the output for reporting and further actions. The system 102 also provide the model training module to monitor the Model performance and accuracy and if require the model may be re-trained and deploy.

Figure 3C:
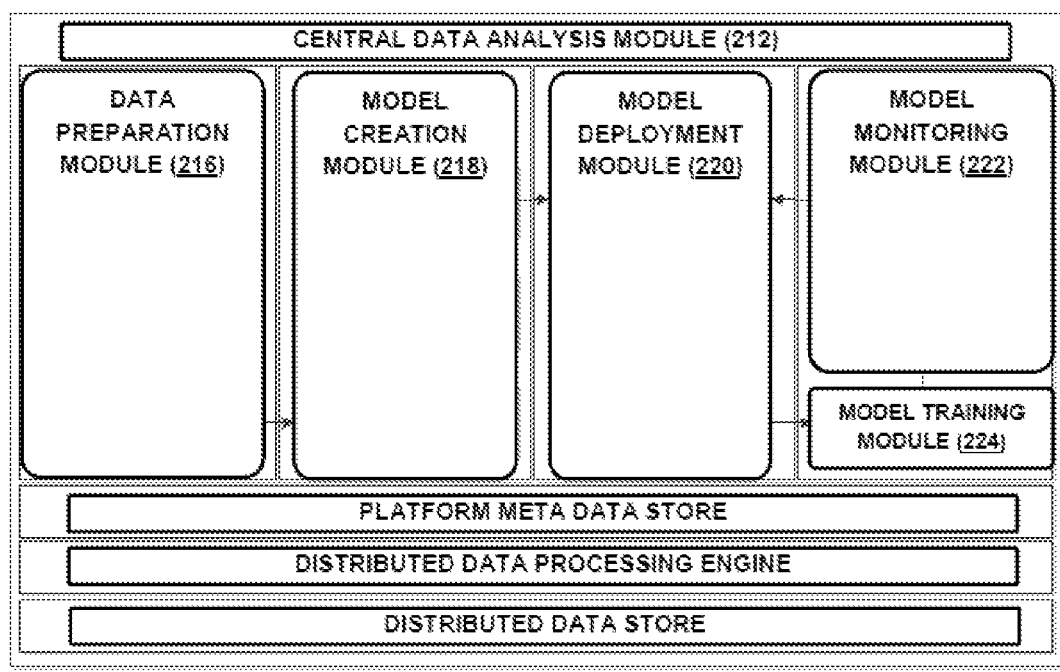
Figure 3D:
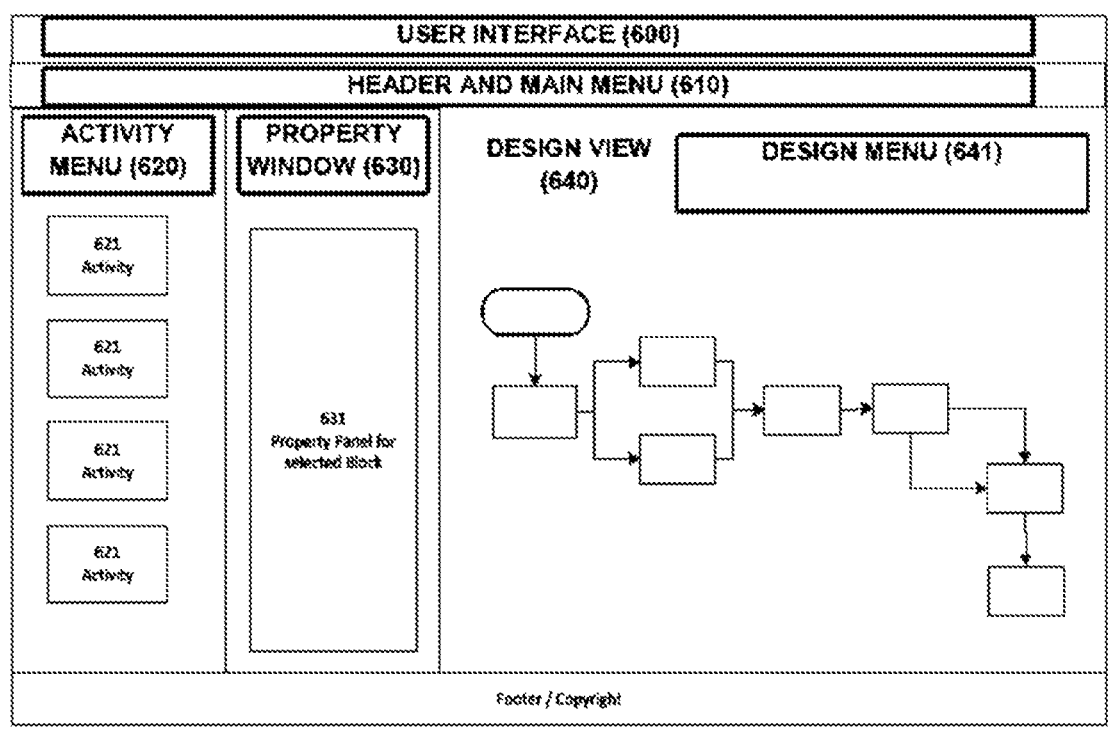

Referring now to FIG. 3C, working of the central data analysis module 212 is illustrated in detail. The central data analysis module 212 has four major blocks. The first block is the data preparation module 216 configured to extract source data from data source location 108. The data preparation module 216 enables the service manager to extract source data and Translate as per ontology mapping, define by the system Engineer, to generate a translated data. The translated data may be stored in the distributed storage 230.

Further, the model creation module 218 enables the data scientist to explore and visualize the translated data. In the next step, the Data Scientist may perform data transformation and standardization on the translated data. The translated data is further explored by apply algorithms to create model. The algorithms may be customized algorithms or standard algorithms like k-means, SVM and the like. Further, the model creation module 218 is configured to test the model on a distributed processing environment. Once the data scientist is satisfied with the model accuracy, the model is saved the platform metadata storage and model is ready for deploy and scheduling using the model deployment module 220. In one embodiment, the model may be a light footprint model. The light footprint model may be operated on electronic devices with less or no processing capabilities such as the edge devices. In one embodiment, the model deployment module 220 is further configured to enable a set of micro services based on the model. The set of micro services are enabled to address one or more segments of the business problem. The set of micro services may be used by one or more micro entities in order to leverage the processing capabilities of the system 102. Further, the model monitoring module 222 and model training module 224 are configured to runtime batch/offline analytics on the deployed model and identify errors. Further, the training module 224 is configured to re-train the model accordingly.

Further, the training module 224 is configured to re-train the mode based on the identified error, if required with latest data and further update the deployed version of the model. In one embodiment, an Extensible Markup Language (XML) based Analytics Data-Exchange Markup Language (ADML) may be used for a communication between the graphical user interface module 210, the business user module 214, the data preparation module 216, the model creation module 218, the model deployment module 220, the model monitoring module 222 and the model training module 224. The ADML may be enabled by the model creation module 218. Further, the ADML may also be used for building a bootstrap engine. The bootstrap engine may be configured to enable the model creation module 218 for building the model using the source data received from the data source location 108. Further, the bootstrapping engine may also identify different algorithms to be used for handling the source data and the communication between different modules of the system 102.

Figure 4:
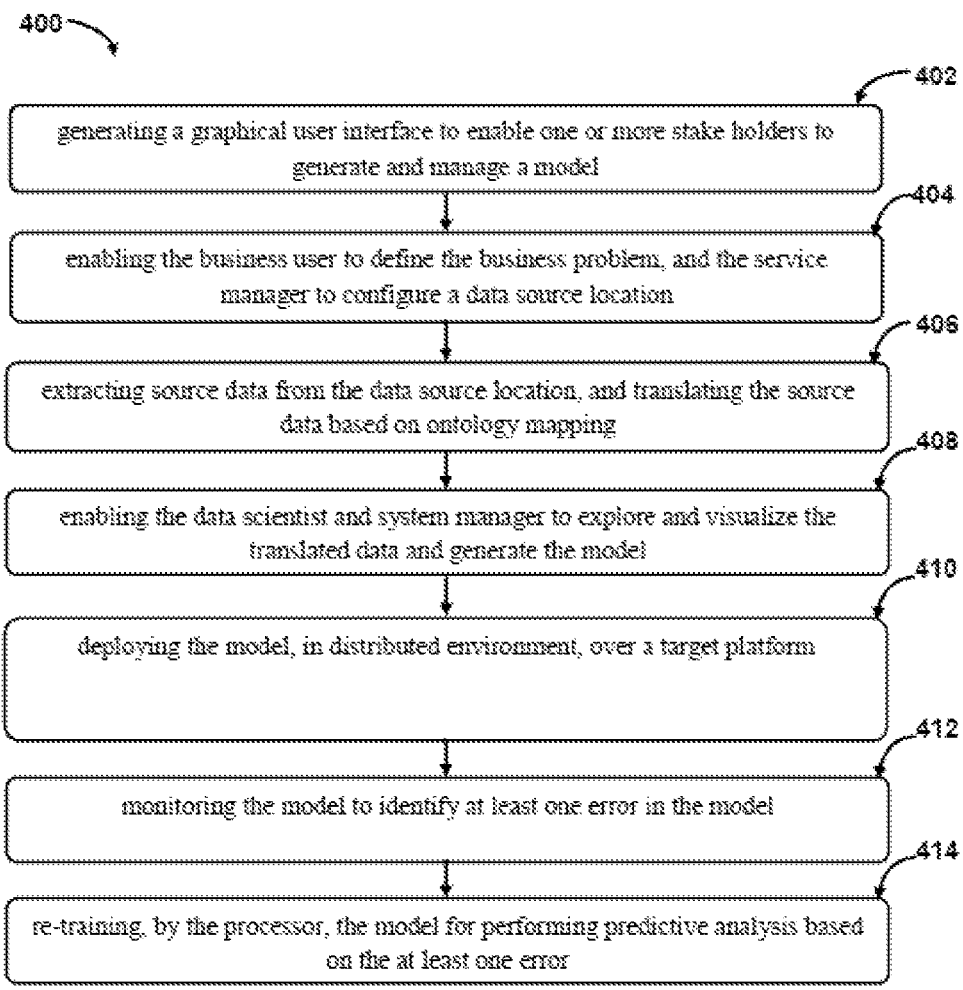
FIG. 4 illustrates a method for enabling machine learning based analytics platform, in accordance with an embodiment of the present subject matter.

Referring to FIG. 4, a user interface 600 enabled by the user interface module 210, is illustrated. The user interface may be used by different stakeholders of the system to design and modify the model in real-time. For example, the system engineers may define device ontology and data mapping, the data scientist may perform data mining, model creation and versioning using the user interface. In one embodiment, the user interface enables different panels/user interface elements like a header and a main menu bar 610, an activity menu 620, a property window 630, and a designer view 640 with a design Menu 641 to save, test and execute the model or the device ontology.

The user may choose different activities 621 from the activity menu 620 and place them into the designer view 640. Activity menu 620 may have inbuilt activities based on the logged-in user and the privileges associated with the logged in user. For example, the system engineer, it displays supported sensor, existing devices etc. and for the Data Scientist it display different Statistics, Transformation and mining related activities like data reader, Split, Score, Discrete Stats, Data transformation [like replace by, MinMax etc.], KMean, Random Forest etc.

All these activities can be used to store and carry value in design execution of the model. Each activity has some property and can be used as per requirement, to set property value Designer has a property panel 631. After creating design it can be tested and save by clicking appropriate button in the Design Menu 641 test and execute button.

Further, the model creation module 218 also enable XML based Analytics Data-Exchange Markup Language (ADML) to enable exchange of information between the user interface 600 and the central data analysis module 212. However, ADML is generic and can be used for data exchange between/among other modules of the system 102.

Following semantic and definition of ADML may be enabled by the model creation module 218:

Complete experiment is defined under <Experiment> tag and it is a collection of Actions defined under <Action> tag. E.g.

Experiment Node—Template

<Experiment Id="vibrationalAnalysis12">
  <!-- ################### Template Node ################### -->
  <Action Id="E1002" NextId="E1004" PreviousId="E1001">
    <Type>Statistics</Type>
    <Name>ConditionalMax</Name>

```
<Property Name="Prop1">Value1</Property>
<Property Name="Prop2">Value2</Property>
</Action>
<Action></Action>
</Experiment>
```
Here,
1. Id: Experiment Unique ID
2. Action: List of Actions in a single Experiment Action Node—Template
```
<Action Id="1002" NextId="1004" PreviousId="1001">
    <Type>Mining</Type>
    <Name>KMeans</Name>
    <Property Name="Prop1">Value1</Property>
    <Property Name="Prop2">Value2</Property>
</Action>
```
1. Action Attributes
    a. Id: Unique Action Id with respect to current experiment.
    b. NextId: Next Action Id to be executed.
        If there are more than one next Actions to be executed in parallel, then use COMMA [,] separated action ids. For all parallels Actions only one action has further Next Actions and rest Actions has blank [" "] action Id.
        If there is no next Action to be linked, then set this as blank [" "].
    c. PreviousId: Previous Action Id.
        If there is no previous action, then set this as blank [" "].
        If there are more than one previous Actions as base input to current action, then use COMMA [,] separated previous action ids.
2. Action child
    a. Type: Type of Action to be execute for example—Split, Score, Evaluate, Transformation, Mining, Statistics and more will be updated as and when add more
    b. Name: Action name of define action type. For example, Action name KMeans of Mining type action.
    c. Property bag: List of input property required to execute a define Action. An Action can contain one or more properties as per requirement and define of Action.

Action Node execution
Experiment XML contains only one action.
1. Action->NextId=""
2. Action->PreviousId=""
Experiment XML contains multiple actions.
3. All Action executed one after another if there are more than one action nodes in experiment xml
4. All Parallel action node define in current Action->NextId will be executed sequentially.
5. Each single node
    a. Execute only once. If it already executed, then it will not execute again.
    b. Execute only if all previous nodes define in Action->PreviousId are executed.

Referring now to FIG. 4, the method to enable the machine learning based analytics platform is illustrated, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

Furthermore, the method can be implemented in any suitable hardware, software, firmware, or combination thereof. However, for ease of explanation, in the embodiments described below, the method 400 may be considered to be implemented in the above described system 102.

At block 402, the processor 202 may enable one or more stakeholders to generate and manage a model. The stakeholders include a business user, a data scientist, a system engineer, and a system manager. In one embodiment, the model may be configured to solve a business problem defined by the business user At block 404, the processor 202 may enable the business user to define the business problem, and the service manager to configure a data source location based on the business problem.

At block 406, the processor 202 may enable extracting the source data from the data source location 108, and translating the source data based on ontology mapping, define by the system Engineer, to generate a translated data. In one embodiment, the transformed data may be stored in a distributed storage 230.

At block 408, the processor 202 may enable the data scientist and system manager to explore and visualize the translated data, transform and standardize the translated data to generate the model. Once the model is generated, the processor may enable the system engineer to evaluate and calibrate accuracy of the model, and save the model over a distributed storage.

At block 410, the processor 202 may enable deploying the model, in distributed environment, over a target platform.

At block 412, the processor 202 may enable monitoring the model to identify at least one error in the model.

At block 414, the processor 202 may enable re-training the model for performing predictive analysis based on the at least one error, thereby enable machine learning based analytics platform.

Although implementations for methods and systems for enabling machine learning based analytics platform have been described in language specific to structural features and/or methods, it is to be understood that the appended claims are not necessarily limited to the specific features or methods described. Rather, the specific features and methods are disclosed as examples of implementations for enabling the machine learning based analytics platform.

We claim:

1. A system to enable a machine learning based analytics platform, wherein the system comprises:
    a processor; and
    a memory coupled with the processor, wherein the processor executes a plurality of modules stored in the memory, and wherein the plurality of modules comprises:
        a graphical user interface module configured to enable one or more stakeholders to generate and manage a model, wherein the one or more stakeholders include a business user, a data scientist, a system engineer, and a system manager, and wherein the model is configured to solve a business problem defined by the business user; and a central data analysis module comprising:
    a business user module for enabling the business user to define the business problem;
    a data preparation module for
        enabling the system manager to configure a data source location based on the business problem,
        extracting source data from the data source location, and
        translating the source data based on an ontology mapping, defined by the system engineer, to generate a translated data, wherein the translated data is stored in a distributed storage;
    a model creation module for enabling the data scientist and the system manager to:
        explore and visualize the translated data,
        transform and standardize the translated data to generate the model,
        evaluate and calibrate accuracy of the model, and
        save the model over a metadata storage;
    a model deployment module configured to deploy the model, in a distributed environment, over a target platform;
    a model monitoring module configured to monitor the model and identify at least one error in the model, wherein the error is in the form of accuracy of prediction;
    a model training module configured to re-train the model, for performing predictive analysis, based on the at least one error, thereby enabling the machine learning analytics platform, wherein the model monitoring module and model training module are configured to at least one of runtime batch, offline analytics on the deployed model and identify errors; and
    a communication interface configured to enable, via an Extensible Markup Language (XML) based Analytics Data-Exchange Markup Language (ADML), communication between the graphical user interface module, the business user module, the data preparation module, the model creation module, the model deployment module, the model monitoring module and the model training module, wherein the ADML is used for building a bootstrap engine, and wherein the bootstrap engine is configured to enable the model creation module for building the model using the source data received from the data source location.

2. The system of claim 1, wherein the graphical user interface module is configured to enable the one or more stakeholders to design a workflow of the model, wherein the workflow is generated using pick and place code blocks enabled by user interface elements of the graphical user interface module, and wherein the user interface elements include an activity bar, a property panel, a header, a main menu bar, a designer space, and a design menu.

3. The system of claim 1, wherein the source data comprises High Business Impact (HBI) data, wherein the data preparation module is configured to mask the HBI data before extracting the source data from the data source location.

4. The system of claim 1, wherein the model deployment module is further configured to enable a set of micro services based on the model, wherein the set of micro services are enabled to address one or more segments of the business problem.

5. The system of claim 1, wherein the model is a light footprint model, and wherein the light footprint model is configured to operate over an edge device.

6. The system of claim 1, wherein the data source location is selected from a Relational Database Management System (RDBMS), a not only Structured Query Language (NoSQL) database, big data, file systems, and sensor data captured from an Internet of Things (IOT) network.

7. The system of claim 1, wherein the model is a cross-platform Predictive Model Markup Language (PMML) model, and wherein the model is executed in a real-time mode and in an offline mode.

8. The system of claim 1, wherein the target platform is selected from a public cloud server, an in-premise cloud server, an installed gateway or an edge device in field.

9. The system of claim 1, wherein the model monitoring module may be configured to generate an alert message to the one or more stakeholders for re-training the model, based on a drop of the accuracy of prediction below a predefined threshold.

10. A method for enabling a machine learning based analytics platform, the method comprising:
    generating, by a processor, a graphical user interface to enable one or more stakeholders to generate and manage a model, wherein the one or more stakeholders include a business user, a data scientist, a system engineer, and a system manager, and wherein the model is configured to solve a business problem defined by the business user;
    enabling, by the processor, the business user to define the business problem and the system manager to configure a data source location based on the business problem;
    extracting, by the processor, source data from the data source location, and translating the source data based on an ontology mapping, defined by the system engineer, to generate a translated data, wherein the translated data is stored in a distributed storage;
    enabling, by the processor, the data scientist and the system manager to explore and visualize the translated data, transform and standardize the translated data to generate the model, evaluate and calibrate accuracy of the model, and save the model over a metadata storage;
    deploying, by the processor, the model, in a distributed environment, over a target platform;
    monitoring, by the processor, the model to identify at least one error in the model, wherein the error is in the form of accuracy of prediction; and
    re-training, by the processor, the model for performing predictive analysis based on the at least one error, thereby enabling the machine learning based analytics platform, wherein monitoring and training are configured to at least one of runtime batch, offline analytics on the deployed model and identify errors; and
    enabling, by an Extensible Markup Language (XML) based Analytics Data-Exchange Markup Language (ADML), communication between the graphical user interface module, the business user module, the data preparation module, the model creation module, the model deployment module, the model monitoring module and the model training module, wherein the ADML is used for building a bootstrap engine, and wherein the bootstrap engine is configured to enable the model creation module for building the model using the source data received from the data source location.

11. The method of claim 10, wherein the processor enables the graphical user interface for the one or more stakeholders to design a workflow of the model, wherein the workflow is generated using pick and place code blocks enabled by user interface elements of the graphical user interface, and wherein the user interface elements include an activity bar, a property panel, a header, a main menu bar, a designer space, and a design menu.

12. The system of claim 10, wherein the data source location is selected from a Relational Database Management System (RDBMS), a not only Structured Query Language (NoSQL) database, big data, file systems, and sensor data captured from an Internet of Things (IOT) network.

13. The method of claim 10, wherein the model is a cross-platform Predictive Model Markup Language (PMML) model, and wherein the model is executed in a real-time mode and in an offline mode.

14. The method of claim 10, wherein the target platform is selected from a public cloud server, an in-premise cloud server, an installed gateway or an edge device in field.

15. The method of claim 10, further comprising generating an alert message to the one or more stakeholders for re-training the model, based on a drop of the accuracy of prediction below a predefined threshold.

16. A non-transitory computer readable medium embodying a program executable in a computing device for enabling a machine learning based analytics platform, the program comprising:
  a program code for enabling a business user to define a business problem and a system manager to configure a data source location based on the business problem;
  a program code for extracting source data from the data source location and translating the source data based on an ontology mapping, defined by a system engineer, to generate a translated data, wherein the translated data is stored in a distributed storage;
  a program code for enabling a data scientist and the system manager to explore and visualize the translated data, transform and standardize the translated data to generate the model, evaluate and calibrate accuracy of the model, and save the model over a metadata storage;
  a program code for deploying the model, in a distributed environment, over a target platform;
  a program code for monitoring the model to identify at least one error, wherein the error is in the form of accuracy of prediction; and
  a program code for re-training the model for performing predictive analysis based on the at least one error, thereby enabling machine learning analytics platform, wherein the model monitoring and model training are configured to at least one of runtime batch, offline analytics on the deployed model and identify errors; and
  a program code for enabling, via an Extensible Markup Language (XML) based Analytics Data-Exchange Markup Language (ADML), communication between the graphical user interface module, the business user module, the data preparation module, the model creation module, the model deployment module, the model monitoring module and the model training module, wherein the ADML is used for building a bootstrap engine, and wherein the bootstrap engine is configured to enable the model creation module for building the model using the source data received from the data source location.

* * * * *